June 21, 1966 KAI CHU 3,257,648

MAGNETIC MEMORY FOR MAGNETO-OPTICAL READOUT

Filed Aug. 15, 1962 2 Sheets-Sheet 1

INVENTOR
KAI CHU

BY Frank Chasling [signature]
ATTORNEY

MAGNETIC MEMORY FOR MAGNETO-OPTICAL READOUT
Filed Aug. 15, 1962
2 Sheets-Sheet 2
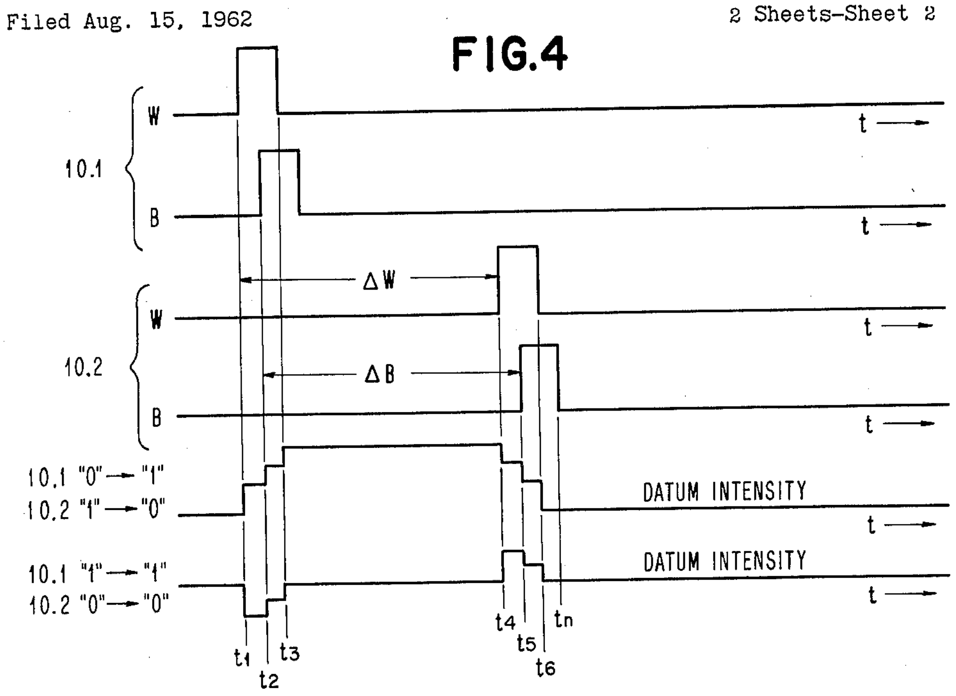
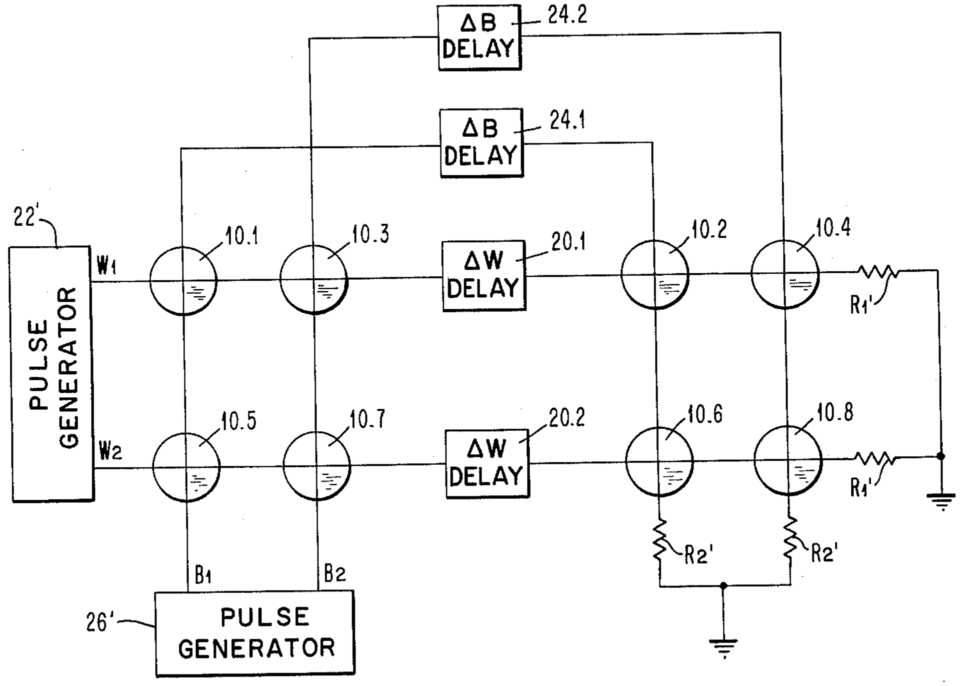
FIG.5

United States Patent Office 3,257,648

Patented June 21, 1966

3,257,648

MAGNETIC MEMORY FOR MAGNETO-OPTICAL READOUT

Kai Chu, Mount Kisco, N.Y., assignor to International Business Machines Corporation, New York, N.Y., a corporation of New York Filed Aug. 15, 1962, Ser. No. 217,134
7 Claims. (Cl. 340—174)

This invention relates to a magnetic thin film memory and more specifically to a magnetic thin film memory particularly adaptable for magneto-optical readout employing two magnetic elements per binary bit.

The limitation for operating speeds of computer memories using uniaxial anisotropic thin magnetic films has been recognized as being dependent upon the time required for recovery of the sense winding from a coupled digit transient occurring during the writing of binary 1's. ("A Computer Memory Using Magnetic Films," by J. J. Raffel and D. O. Smith, UNESCO, Proceedings of the International Conference on Information Processing, Paris 15–20, June 1959; "Magnetic Thin Film Design" by J. J. Raffel et al., Proceedings of the IRE, vol. 49, No. 1, January 1961, pages 155–164.) An approach to alleviate this limitation has been to employ a Kerr apparatus for magneto-optical readout of such memories instead of inductive readout. By use of a Kerr apparatus, a beam of polarized light is directed to a single magnetic film element and the intensity of the light reflected, due to a positive or negative rotation, is employed to detect the state of the individual element. Such optical readout systems suffer the limitations of registration of the polarized light beam to particular ones of the magnetic thin film elements with the attendant mechanism cost therefore and deleterious reflections from adjacent elements contributing to erroneous reflected light intensities.

A magnetic thin film memory constructed for use in combination with a Kerr magneto-optical readout apparatus according to this invention avoids the disadvantages heretofore attendant with such systems. Basically, the memory of this invention comprises a plurality of binary storage cells with each cell defined by an information and a complementary thin magnetic film element. The magnetization stable state of the complementary element is maintained in an opposite stable state than that of the information element. By utilizing a storage cell as defined, the polarized light from the Kerr apparatus is allowed to shine on an entire array to provide a datum reflected light intensity from the array. Readout is accomplished by selecting a storage cell, in a plane of such cells, and switching the cell to a binary zero representing state. If the selected storage cell is initially in a binary one stable state, the information magnetic element of the cell is first switched from one stable state to an opposite stable state, causing a deviation in the reflected datum light intensity, and thereafter the complementary magnetic element of the cell is switched from the opposite stable state to the one stable state causing the intensity of the reflected polarized light to return to the datum level. By utilizing the basic storage cell as set forth, a plurality of such cells may be employed in the same plane for a memory and readout of a particular cell accomplished by normal readout techniques for the memory rather than positioning of the light beam.

Accordingly, it is a prime object of this invention to provide an improved magnetic thin film memory.

Another object of this invention is to provide an improved magnetic thin film memory particularly adapted for use with a Kerr magneto-optic readout apparatus.

Still another object of this invention is to provide an improved binary storage cell utilizing a pair of complementary magnetized thin magnetic film elements adaptable for use with a Kerr magneto-optical readout apparatus.

Yet another object of this invention is to provide a magnetic thin film memory in combination with a Kerr magneto-optical readout apparatus arranged to provide easily detectable information output signals without registration of a light beam on a particular magnetic element and to maintain a reflected datum intensity of light.

The foregoing and other objects, features and advantages of the invention will be apparent from the following more particular description of a preferred embodiment of the invention, as illustrated in the accompanying drawings.

In the drawings:

FIG. 4 illustrates a pulse program for operation of the embodiment of FIG. 3.

FIG. 5 illustrates another embodiment of this invention.

Figure 1:
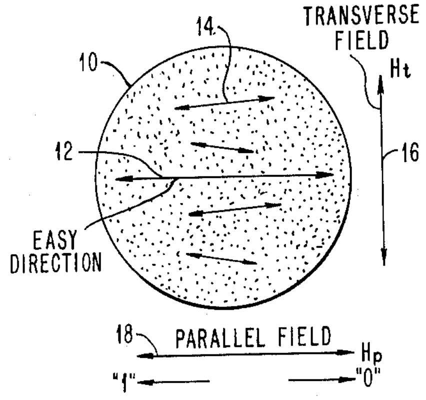
FIG. 1 is a schematic illustration of a magnetic thin film element.

Generally, magnetic material may be considered as containing a multiplicity of small magnetically saturated regions which are called domains. In demagnetized materials these domains are randomly positioned such that the resultant magnetization of the specimen is zero. Changes in magnetization may be accomplished by rotation of the domains and by domain wall motion. In rotation a magnetic moment which is representative of each of the domains within the material, rotates similar to a compass needle. This type of rotational mechanism provides very high switching speeds when switching from one to another stable magnetic state. Domain wall switching, on the other hand, is generally a slower process in which changes in the magnetization occur by the growth of domains parallel to the applied field at the expense of domains oriented antiparallel with the applied field.

Certain materials exhibit the characteristic of uniaxial anisotropy wherein the magnetic moments in the material tend to line up along an easy direction of magnetization. This characteristic may be produced in thin films of magnetic material which are in the order of 1000 angstroms in thickness, but it should be noted, however, that other forms of magnetic material, such as tapes and ferrites in appropriate geometries, also exhibit this characteristic under certain conditions. The preferred uniaxial anisotropic magnetic element employed in this invention is a thin magnetic film shaped in the form of a disc 10, as is shown in the FIG. 1, having a composition of approximately 80% nickel and 20% iron. The material is evaporated or otherwise deposited by suitable means on a substrate, not shown, usually of glass, in a high vacuum ($10^{-6}$ mm. Hg), to a thickness of approximately 1200 angstroms in the presence of a magnetic field such that the deposited material has a uniaxial anisotropic characteristic, i.e., a single easy axis of magnetization 12 along which individual magnetic moments 14 of the material tend to lie. The preferred axis of magnetization 12 of the film 10 is then the resultant axis along which all the magnetic moments 14 within the film 10 tend to align themselves. A magnetic field which is applied transverse to the preferred or easy axis of magnetization 12 of the film 10 is represented by a double-headed arrow 16 which may be symbolized by, and is hereinafter referred to as H*t*. A transverse field, H*t*, may be defined as a magnetic field applied parallel to the plane of the film 10 in such a direction as to produce a field perpendicular to the easy axis 12 of the film 10. A magnetic field which is applied parallel to the preferred axis of magnetization 12 of the film 10 is represented by a double-headed arrow 18 which may be symbolized by, and is hereinafter referred to as H$p$. A parallel field, H$p$, may be defined as a magnetic field applied parallel to the plane of the film 10 in such a direction as to produce a field parallel to the easy axis 12 of the film 10. It should be noted that both types of fields, H$t$ and H$p$, may be applied in either direction as is indicated by the double-headed arrows 16 and 18, respectively. In order to provide a designation for the directions of residual magnetization which the moments 14 of the film 10 may assume, the direction of magnetization from right to left is arbitrarily designated as a 0 stable state while the direction of magnetization from left to right is arbitrarily designated as a 1 stable state.

Switching of the state of the element 10 as represented by the moments 14 from say the 0 to the 1 stable state or, from the 1 to the 0 stable state, is accomplished by applying a field H$t$ and H$p$ in at least partial coincidence. The field H$t$ applies a torque to all the moments 14 within the element 10 to start rotation of the moments 14 in either the clockwise or counterclockwise direction depending upon its direction. Under the influence of the field H$t$, the moments 14 of the element 10 could rotate to a maximum of 90° with respect to the preferred direction of magnetization 12. With the combination of the field H$p$ applied in coincidence with the field H$t$, it may be seen that the moments 14 rotate toward the 1 state or from the 1 state toward the 0 state depending upon the direction of the field H$p$ applied. The final state assumed by the element 10 is then not dependent upon the direction of the applied field H$t$, but is dependent upon the direction of the applied field H$p$, and the moments 14 of the element 10 rotate either clockwise or counterclockwise as a function of the initial state of the element and the direction of the applied transverse field H$t$.

Figure 2:
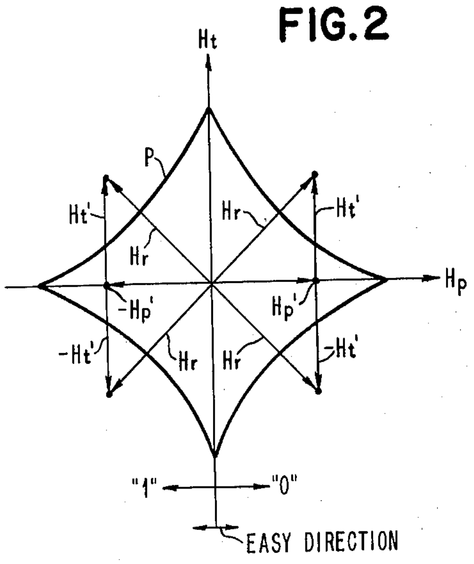
FIG. 2 is a plot of a rotational switching characteristic of the element of FIG. 1.

With reference to the FIGS. 1 and 2, and, more particularly, to the FIG. 2, the switching characteristic of a magnetic material having properties similar to the element 10 of the FIG. 1 is shown which comprises a plot of applied field H$t$ vs. H$p$. The easy direction 12 of the film 10 is shown to be parallel to the horizontal coordinate H$p$ and the arbitrarily designated remanence directions of 1 and 0 are also indicated. The dark lines which intercept each of the coordinates traversing the different quadrants define the critical region of switching, in that, within an area defined by the critical curves, labelled P, there is no rotational switching of the moments 14, and without this area P, rotational switching of the moments 14 does occur. An applied field, H$p$, of insufficient magnitude to cause switching of the element 10 from one stable state to another is designated by the points $+$H$p'$ and $-$H$p'$. If the field $+$H$p'$ or $-$H$p'$ were applied to a magnetic material having the switching characteristics defined by FIG. 2, rotational reversal of the moments 14 within the material would not take place since the resultant field vector is not placed without the area P. An applied field, H$t$, of insufficient magnitude to cause switching of the element 10 is designated by the points $+$H$t'$ and $-$H$t'$. If the field $+$H$t'$ or $-$H$t'$ were applied to the magnetic material having the switching characteristics as defined by FIG. 2, reversal of the moments 14 within the material again would not take place since the resultant field vector magnitude is insufficient to be placed without the area P. If, however, both the fields $+$H$p'$ or $-$H$p'$ and $+$H$t'$ or $-$H$t'$, are coincidently applied to the element 10, it may be seen that the resultant field vector H$r$ in both instances is such that the applied magnetic fields result in a vector without the area P. It should be noted, however, that the magnitude of the field H$p$ as delineated by the values $+$H$p'$ or $-$H$p'$, may be decreased while the magnitude of the applied fields $+$H$t'$ or $-$H$t'$ may be increased just so long as the resultant field vector H$r$ is placed without the area P. Further, the direction of rotation which the moments 14 of the element 10 undergo upon application of the coincident fields H$t$ and H$p$ is determined by the state in which the magnetization of the element 10 is in, i.e., either the 1 or the 0 state, and, upon the direction of the field H$t$ applied. The final state assumed by the element 10, however, is not dependent upon the applied field H$t$, but is dependent upon the direction of the field H$p$ applied.

Figure 3:
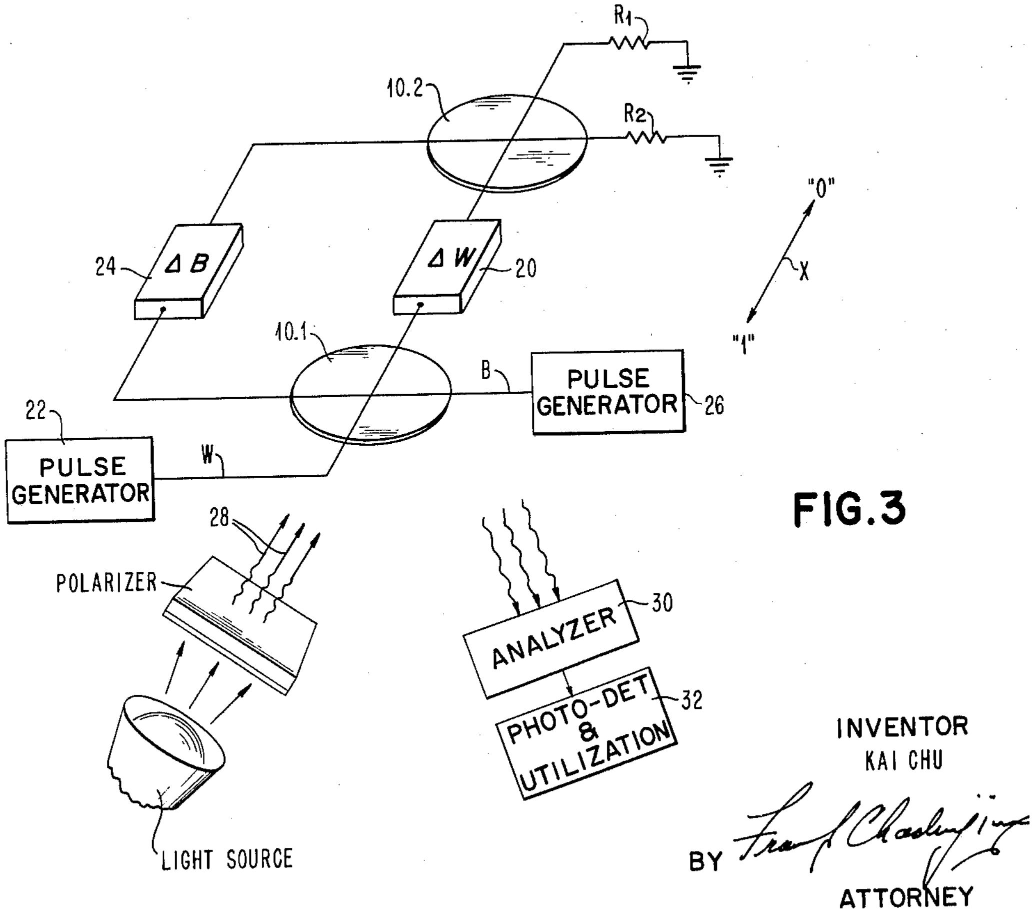
FIG. 3 illustrates one embodiment of this invention.

Reference is now made to FIG. 3 wherein a pair of magnetic thin films 10.1 and 10.2 are provided each having an easy axis 12 aligned in a direction indicated by an arrowed line X. The films 10 are normally deposited on a transparent, nonmagnetizable, substrate member such as glass (not shown). The films 10.1 and 10.2 are provided with a word conductor W coupling the film 10.1 along the easy axis of magnetization such as to apply a transverse field to the film when energized and similarly coupled to the film 10.2 through a ΔW pulse delay means 20. The conductor W is connected to a pulse generator 22 at one end and to ground through a load impedance R1 at the other. The film 10.1 is also coupled by a bit conductor B which couples the film 10.1 transverse to the word conductor W such as to apply a field directed along the easy axis 12 of the film and is also similarly coupled to the film 10.2 through a ΔB delay means 24. The bit conductor B couples the film 10.1 in one sense while coupling the film 10.2 in an opposite sense, i.e., a field which is applied to the film 10.1 by the energization of the conductor B will be delayed and applied to the film 10.2, which field is directed oppositely in sense to that applied to the film 10.1. The conductor B has one end connected to ground through a load impedance R2, and the other connected to a pulse generator 26. Associated with the films 10.1 and 10.2 is a Kerr magneto-optical readout apparatus for providing an output manifestation of the states of the films 10.1 and 10.2.

The Kerr apparatus is generally shown as consisting of a light source and a polarizer to provide polarized light waves indicated by arrowed lines 28. The polarized light 28 is to be reflected off the films 10.1 and 10.2 and these reflected light waves are made to impinge by their angle of incidence on an analyzer unit 30 which is connected to a photo-detection and utilization means 32. The Kerr effect is known and has been used in the observation of magnetic properties as reported by C. A. Fowler and E. M. Fryer in an article entitled "Magnetic Domains by the Longitudinal Kerr Effect," Phy. Rev., vol. 94, page 52, 1954, and by H. J. Williams et al. in an article entitled "Observations of Magnetic Domains by the Kerr Effect," Phy. Rev., vol. 82, page 119, 1951. Increased contrast in the Kerr effect has been achieved by utilizing magnetic thin films as reported in a paper entitled, "Magnetic Domains in Evaporation Thin Films of Nickel-Iron," C. A. Fowler et. al., Phy. Rev., vol. 104, page 645, 1956; and in a paper entitled "Magnetic Domains in Thin Films of Nickel-Iron," by C. A. Fowler et al., Phy. Rev., vol. 100, page 746; and an article entitled "Magnetic Domains in Thin Films by the Faraday Effects," by C. A. Fowler et al., Phy. Rev., vol. 104, page 552, 1956. The latest theory given on the Faraday and Kerr effects on ferromagnetic material is given in an article entitled "Theory of the Faraday and Kerr Effects in Ferromagnetics" by P. N. Argyres, Phy. Rev., vol. 97, No. 2, Jan. 15, 1955, page 334. The model discussed is capable of describing the rotation of the plane of polarization of the light and the ellipticity resulting from transmission or reflection of the ferromagnetic medium. Basically, the Kerr effect consists of a polarized light shining upon the surface of a magnetic medium and upon reflection from the magnetic surface, this light is either rotated positively or negatively depending upon the magnetic remanent orientation of the film. That is, the polarized light may be rotated negatively for a film magnetized in the binary 0 state. Here, the analyzer 30 is arbitrarily positioned so as to filter only through that reflected polarized light which is rotated positively off the surface of the films 10.1 and 10.2. Further, whenever a Kerr apparatus or simply a magneto-optical means is referred to subsequently in the detailed description to follow and in claims, what is meant is, all the apparatus required for originating the polarized light and detecting this light as it is reflected in rotated form off the magnetic films.

As an aid in explaining the operation of the circuit of FIG. 3, the sequence of pulses realized on conductors W and B to elements 10.1 and 10.2 by operation of pulse generators 22 and 26, respectively, with the output signal provided to the utilization means 32 is indicated in FIG. 4, wherein various labelled time intervals, (*to–tn*) are indicated and will be referred to subsequently in the detailed description to follow.

Referring again to FIGS. 3 and 4, assume initially that the magnetization of the film 10.1 is such as to be in the binary 0 state and the magnetization of the film 10.2 is such as to be in the binary 1 state at the time (*to*), as indicated in FIG. 4. With the states of the films 10.1 and 10.2 being as stated, the intensity of the light filtered through analyzer 30 to utilization means 32 due to reflection off both films 10.1 and 10.2, will be of a given magnitude, here considered as a datum intensity. Assume now at the time *t1*, pulse source 22 is operative to apply a positive pulse to the conductor W which, in turn, applies a transverse field H*t* to the film 10.1. The magnetization vector M of the film 10.1 is rotated away from easy axis 12 into a direction which is in alignment with the field H*t* applied thereto. Since the Kerr apparatus is positioned so that only the light rotated from reflection off the film in the 1 stable state will cause an increase in intensity, and the film 10.1 was in the binary 0 state, there is a slight change sensed by utilization means 32 at this time. At a time *t2*, the pulse source 26 is operative to apply a positive pulse to conductor B which, in turn, applies a parallel field H*p* along the easy axis of the film 10.1, coincidently with the application of the field applied to the film 10.1 by the energized conductor W. The easy axis field H*p* is in a direction such as to reverse the magnetization of the film 10.1 from the binary 0 state to the binary 1 stable state. Upon termination of the pulse from source 22 at *t3*, the film 10.1 rotates to and is established in the binary 1 state. At time *t2* and *t3*, the intensity of the light detected by the Kerr apparatus is increased since at the time *t2* the magnetization of element 10.1 is rotated further toward the 1 stable state while at time *t3* both the films 10.1 and 10.2 are in the binary 1 state. The pulse applied to the conductor W by source 22 is delayed a predetermined time interval ΔW by the delay device 20 and is transmitted to the film 10.2 at a time *t4* to apply a transverse field H*t* to the film 10.2 at this time. The magnetization of the film 10.2 is rotated into a direction in alignment with the transverse field H*t* applied thereto and since the magnetization of film 10.2 is rotated out of the binary 1 stable state, the intensity of the light detected by the Kerr apparatus is decreased as indicated. The pulse provided on conductor B by source 26 is delayed by an interval of time ΔB determined by the delay device 24 such as to apply a field directed along the easy axis of the film 10.2 at a time *t5* in coincidence with the application of the transverse field H*t*. It should be noted that the field H*p* applied to the film 10.2 is directed in an opposite sense to the film 10.2 than that applied to the film 10.1 due to the sense in which the conductor B couples the film 10.2. At time *t5*, the magnetization of film 10.2 is rotated further toward the 0 state causing a further decrease in sensed light intensity. Upon collapse at *t6*, of the transverse field H*t* applied to the film 10.2, the film 10.2 is established in the binary 0 state, and the sensed reflected light intensity is re-established in the datum state.

Assume that at the time *to*, the film 10.1 is in the 1 state while the film 10.2 is in the 0 state, the exact opposite of the previous case. At the time *t1*, the magnetization of film 10.1 is rotated from the 1 orientation state to a direction transverse with respect to the easy axis due to application of a transverse field H*t*. The rotation of the magnetization of film 10.1 out of the 1 stable state causes a decrease in sensed polarized light reflection from the datum intensity level. At time *t2*, the field H*p* applied to film 10.1 by coincident energization of conductor B by source 22 causes the magnetization of film 10.1 to be rotated toward the 1 state, decreasing the amount of negative deviation of sensed light reflection from the datum intensity level. Upon collapse of the transverse field H*t* to the film 10.1 at *t3*, the magnetization of film 10.1 is re-established in the 1 stable state and the intensity of sensed light reflection returns to the datum intensity level. After a ΔW delay period, at time *t4*, a field H*t* is applied to film 10.2 causing rotation of the magnetization of film 10.2 from the 0 state to a direction transverse with respect to the easy axis. Rotation of the magnetization of film 10.2 out of the 0 state causes an increase in sensed light intensity. After a ΔB delay period, at time *t5*, a field H*p* is applied to film 10.2 directed into the 0 state causing rotation of the magnetization of film 10.2 toward the 0 state and, hence, a slight decrease in the positive intensity of sensed light reflection. Upon termination of the field H*t* to film 10.2 at time *t6*, the magnetization of film 10.2 is established in the 0 stable state causing the light intensity to be re-established at the datum intensity level.

Thus, the Kerr magneto-optical readout apparatus needs only be operative during the readout portion of the magnetic memory and if the elements 10.1 and 10.2 are in one complementary state a positive deviation in light intensity may be obtained for time period of $$[\Delta W-(t3-t1)]$$

During this time interval, with the films 10.1 and 10.2 in an opposite complementary state, there is no positive deviation of light intensity from the datum intensity level. It should be noted, that if desired, the return to the datum intensity level may be employed as a redundancy check for the circuit either with respect to just the positive deviation of light intensity or the opposite deviations obtained when the films are in the opposite complementary state.

Referring to FIG. 5, a magnetic memory for a magneto-optical readout employing the principles set forth above is shown which comprises two words having a length of two bits apiece, otherwise defined at 2×2 memory. In FIG. 5, magnetic thin films 10.1–10.8 are provided arranged in word columns and bit rows. A plurality of word column conductors W1 and W2 are provided each coupling a first plurality of magnetic thin film elements and a second like plurality of magnetic thin film elements through an associated ΔW delay device 20. Each of the word column conductors W1 and W2 has one end connected to a word address and drive means 22′ and has the other end connected to ground through a respective load impedance R1′. A plurality of row conductors B1 and B2 are provided each coupling all the magnetic thin film elements in an associated row of the first plurality of elements defined by said word column conductors and the second plurality of magnetic elements in a given row defined by said word column conductors through an associated ΔB delay device 24.1 and 24.2, respectively. One end of the bit row conductors B1 and B2 is connected to an information bit drive selection means 26′ while the other end is connected to ground through a load impedance R2′. Information is entered into a selected word by coincidently energizing a selected one of the word column conductors W and at least a selected one of the bit row conductors B to arbitarily establish one of the first plurality of magnetic elements in the 1 stable state and the associated magnetic element in the second plurality in the 0 stable state. Readout may be accomplished by energization of the same word column conductor W and sequentially energizing each bit row conductor B to establish the first plurality of magnetic thin film elements associated with the selected word conductor in the 1 stable state and the second plurality of magnetic thin film elements associated with the selected word column conductor W in the 0 stable state, similar to the operation as set forth above for FIG. 3. If desired, however, readout may be accomplished by simultaneously energizing all the bit conductors B. In this latter case, depending upon the number of magnetic thin film elements originally in the 0 stable state, the intensity of light reflected off the array by the Kerr apparatus will be of a predetermined amount, that is, if only one of the first plurality of elements is switched from 0 stable state to the 1 stable state then the amount of reflection in intensity from the datum intensity will be of a given amount, while if two are of such elements were originally established in the 0 stable state then the reflection and light intensity will be double this predetermined amount, thus the digital representation or either binary 0's or binary 1's will be quantized. However, upon completion of the switching of the associated or second plurality of magnetic thin film elements, the intensity of light reflected by the Kerr apparatus will be re-established at the datum intensity level.

While the embodiment of FIG. 5 relates to a two dimensional word organized memory, it should be understood that a bit organized memory could be just as easily employed in that each plane of thin film elements would designate a particular bit of a plurality of words. In such a memory, either a single light source or multiple light sources may be employed in the Kerr apparatus, however, an analyzer and detection circuit would have to be provided for each plane of the memory.

While the invention has been particularly shown and described with reference to a preferred embodiment thereof it will be understood by those skilled in the art that the foregoing and other changes in form and details may be made therein without departing from the spirit and scope of the invention.

What is claimed is:

1. In combination, a magnetic memory plane comprising:

a first matrix of planar information anisotropic magnetic thin film elements each exhibiting an easy axis of magnetization defining opposite stable states of remanent flux orientation;

a second matrix of planar complementary anisotropic magnetic elements each exhibiting an easy axis of magnetization;

a plurality of first coordinate input circuit means each coupling all the information elements in one row of said first matrix and all the complementary elements of a corresponding row of said second matrix for applying a field directed transverse to the easy axis of said information elements and after a predetermined time delay applying a similar field to said complementary elements, when energized;

a plurality of second coordinate input circuit means each coupling all the information elements in one column of said first matrix and all the complementary elements is a corresponding column of said second matrix for first applying a field of one sense directed along the easy axis of all the information elements coupled which is insufficient, of and by itself, to cause a reversal of the magnetization of any one element and after said predetermined time delay applying a similar field of opposite sense to all the complementary elements coupled, when energized;

means for coincidently energizing a selected one of said first cordinate input circuit means and at least one of said plurality of second coordinate input circuit means to first estbalish one of said information elements in a first stable magnetic state and after said predetermined time delay to establish a corresponding one of said complementary elements in an opposite stable state;

and a magneto-optical means for reading out the state of said information and complementary elements comprising a source of polarized light waves simultaneously impinging on the surface of all the elements of both said first and second matrix.

2. The combination as set forth in claim 1, wherein each said plurality of first coordinate input circuit means and said second cordinate input circuit means includes a similar delay circuit means connected intermediate the coupling of said information elements and said complementary elements.

3. The combination as set forth in claim 1, wherein each said information and complementary elements exhibit uniaxial anisotropy.

4. In combination:

a magnetic data storage circuit comprising;

an information and a complementary planar anisotropic magnetic thin film element exhibiting an easy axis of magnetization defining opposite stable states of remanent flux density;

a first input circuit means coupling said information and complementary elements for applying a field directed transverse to the easy axis of said information element and after a predetermined time delay, to apply a similar field to said complementary element, when energized;

a second input circuit means coupling said information and complementary elements for applying a field of one sense directed along the easy axis of said information element whose magnitude is insufficient, of and by itself, to cause a remanent change in the magnetization thereof and after said predetermined time delay for applying a similar field of opposite sense to said complementary element, when energized;

means for coincidentally energizing said first and second input circuit means to establish said information element in one stable state and said complementary element in an opposite stable state;

and magneto-optical means for reading out the binary information defined by the states of both said information and complementary elements comprising a source of polarized light waves directed to simultaneously impinge on the surface of both said information and complementary elements.

5. The combination as set forth in claim 4, wherein both said information and complementary element exhibit uniaxial anisotropy.

6. The combination as set forth in claim 5, wherein said second input circuit means couples said information element in one sense and said complementary element in an opposite sense.

7. The combination as set forth in claim 6, wherein said first input circuit means and said second input circuit means include a respective delay circuit means connected intermediate the coupled information and complementary elements.

No references cited.

IRVING L. SRAGOW, *Primary Examiner.*

G. LIEBERSTEIN, *Assistant Examiner.*